United States Patent
Eom et al.

(10) Patent No.: US 10,456,772 B2
(45) Date of Patent: Oct. 29, 2019

(54) SOLID CARBON DIOXIDE ABSORBENT INCLUDING AMINE OR A COMPOUND THEREOF FOR USE IN THE CAPTURING PROCESS OF DRY CARBON DIOXIDE, AND METHOD FOR MANUFACTURING SAME

(71) Applicant: KOREA ELECTRIC POWER CORPORATION, Daejeon (KR)

(72) Inventors: Tae Hyoung Eom, Daejeon (KR); Joong Beom Lee, Daejeon (KR); Chong Kul Ryu, Daejeon (KR); Kyeong Sook Kim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 1 day.

(21) Appl. No.: 15/809,614

(22) Filed: Nov. 10, 2017

(65) Prior Publication Data

US 2018/0078920 A1 Mar. 22, 2018

Related U.S. Application Data

(62) Division of application No. 14/355,134, filed as application No. PCT/KR2011/008196 on Oct. 31, 2011, now Pat. No. 9,844,766.

(51) Int. Cl.
| | |
|---|---|
| B01J 20/32 | (2006.01) |
| B01D 53/02 | (2006.01) |
| B01J 20/28 | (2006.01) |
| B01J 20/30 | (2006.01) |
| B01J 20/34 | (2006.01) |
| B01J 20/22 | (2006.01) |

(52) U.S. Cl.
CPC .......... B01J 20/3295 (2013.01); B01D 53/02 (2013.01); B01J 20/22 (2013.01); B01J 20/2803 (2013.01); B01J 20/28011 (2013.01); B01J 20/28061 (2013.01); B01J 20/3078 (2013.01); B01J 20/3085 (2013.01); B01J 20/3204 (2013.01); B01J 20/3248 (2013.01); B01J 20/3272 (2013.01); B01J 20/3425 (2013.01); *B01D 2253/20* (2013.01); *B01D 2253/25* (2013.01); *B01D 2257/504* (2013.01); *Y02C 10/04* (2013.01); *Y02C 10/06* (2013.01); *Y02C 10/08* (2013.01)

(58) Field of Classification Search
CPC .................................................... B01J 20/3295
See application file for complete search history.

(56) References Cited

U.S. PATENT DOCUMENTS

| | | | |
|---|---|---|---|
| 782,059 A | 2/1905 | Romunder | |
| 4,181,132 A | 1/1980 | Parks | |
| 4,240,922 A | 12/1980 | Sartori et al. | |
| 4,515,900 A | 5/1985 | Hettinger, Jr. et al. | |
| 4,810,266 A | 3/1989 | Zinnen et al. | |
| 5,214,019 A | 5/1993 | Nalette et al. | |
| 5,492,683 A | 2/1996 | Birbara et al. | |
| 5,876,488 A | 3/1999 | Birbara et al. | |
| 6,165,433 A | 12/2000 | Chakravarti et al. | |
| 6,280,503 B1 | 8/2001 | Mayorga et al. | |
| 6,547,854 B1 | 4/2003 | Gray et al. | |
| 6,908,497 B1 | 6/2005 | Sirwardane | |
| 7,045,483 B2 | 5/2006 | Noda et al. | |
| 7,067,456 B2 | 6/2006 | Fan et al. | |
| 7,314,847 B1 | 1/2008 | Siriwardane | |
| 7,314,877 B2 | 1/2008 | Sato et al. | |
| 9,844,766 B2 | 12/2017 | Eom et al. | |
| 2004/0126293 A1 | 7/2004 | Geerlings et al. | |
| 2005/0169825 A1 | 8/2005 | Cadours et al. | |
| 2007/0072769 A1 | 3/2007 | Imada et al. | |
| 2008/0293976 A1 | 11/2008 | Olah et al. | |

FOREIGN PATENT DOCUMENTS

| | | |
|---|---|---|
| CN | 1634652 A * | 7/2005 |
| CN | 1795979 | 7/2006 |
| CN | 101500704 | 8/2009 |
| JP | 2006187701 | 7/2006 |
| JP | 2007/090208 | 4/2007 |
| KR | 10-0620546 | 7/2006 |
| KR | 1020110006073 | 1/2011 |

(Continued)

OTHER PUBLICATIONS

English machine translation of CN-1634652-A (2005).*
International Search Report (with English translation) for International (PCT) Patent Application No. PCT/KR2011/008196, dated May 1, 2012, 5 pages.
Written Opinion (with English translation) for International (PCT) Patent Application No. PCT/KR2011/008196, dated May 1, 2012, 7 pages.
International Preliminary Report on Patentability (with English translation) for International (PCT) Patent Application No. PCT/KR2011/008196, dated May 6, 2014, 9 pages.
Official Action for Australian Patent Application No. 2011380572, dated May 19, 2015, 2 pages.

(Continued)

*Primary Examiner* — Peter F Godenschwager
(74) *Attorney, Agent, or Firm* — Sheridan Ross P.C.

(57) ABSTRACT

The present invention relates to a method for manufacturing a carbon dioxide absorbent and to the absorbent manufactured by the method. The method comprises: (A) a step of preparing a slurry composition including a carrier composition containing a support, an inorganic binder, and a solvent; (B) a step of preparing solid particles by spray drying the thus-prepared slurry composition; (C) a step of manufacturing a carrier by dry calcining the thus-prepared solid particles; and (D) a step of receiving an amine compound into the pores of the thus-manufactured carrier. According to the absorbent of the present invention, an absorbing reaction and a regenerating reaction at a low temperature range (less than or equal to 100° C. may be conducted, and therefore, the cost for capturing $CO_2$ in a dry capturing process may be expected to decrease.

2 Claims, 7 Drawing Sheets

(56) References Cited

FOREIGN PATENT DOCUMENTS

WO    WO 2004/054705    7/2004

OTHER PUBLICATIONS

Official Action (with English translation) for Chinese Patent Application No. 201180075418.3, dated May 19, 2015, 14 pages.
Official Action for U.S. Appl. No. 14/355,134, dated Sep. 20, 2016, 7 pages.
Official Action for U.S. Appl. No. 14/355,134, dated Feb. 22, 2017, 5 pages.
Official Action for U.S. Appl. No. 14/355,134, dated Aug. 16, 2017, 7 pages.

* cited by examiner (a)  (b)

SOLID CARBON DIOXIDE ABSORBENT INCLUDING AMINE OR A COMPOUND THEREOF FOR USE IN THE CAPTURING PROCESS OF DRY CARBON DIOXIDE, AND METHOD FOR MANUFACTURING SAME

CROSS REFERENCE TO RELATED APPLICATIONS

This application divisional application and claims benefit to U.S. application Ser. No. 14/355,134, filed on Apr. 29, 2014, which was filed to a national stage application under 35 U.S.C. 371 and claims the benefit of PCT Application No. PCT/KR2011/008196 having an international filing date of Oct. 31, 2011, which designated the United States, the disclosure of which is incorporated herein by reference.

TECHNICAL FIELD

Aspects of the present invention relate to a solid carbon dioxide absorbent (sorbent) including amine or a compound thereof and a method for manufacturing the same.

BACKGROUND ART $CO_2$ capture and storage (CCS) technology is recognized as the most efficient and direct method for reducing the release of $CO_2$ affecting global warming. In the CCS technology, carbon dioxide is captured from a large volume of $CO_2$ release source, such gas streams, i.e. flue gas streams, produced by fossil fuel-fired power plants, and syngas streams produced by the gasification of coal and reforming of natural gases (commonly called "fuel gases"), and is stably stored.

Technical approaches for capturing $CO_2$, including wet scrubbing using an aqueous solution of monoethanolamine (MEA), ammonia or potassium carbonate ($K_2CO_3$), adsorption, such as pressure swing adsorption (PSA) or temperature swing adsorption (TSA), membrane separation, cryogenic fractionation, and the like, are currently researched. However, these methods have problems of high capture cost or difficulty in application to electric power plants or large-scale industries.

Dry regenerable $CO_2$ sorbent technology recognized as an innovative technology for efficiently and cost-effectively capturing carbon dioxide, refers to a technology in which an active component present in a solid sorbent, which is called a dry regenerable $CO_2$ sorbent, instead of a liquid solvent used in a conventional wet chemical absorption, is chemically reacted with carbon dioxide to form a stable compound, followed by isolating pure carbon dioxide using water vapor and an additional heat supply. In addition, the solid sorbent used in the dry regenerable $CO_2$ sorbent technology can be continuously reused through repeated reactions and regeneration of carbon dioxide. Further, in the dry regenerable $CO_2$ sorbent technology, since a fluidized bed process is employed, an installation area is reduced. In addition, in the dry regenerable $CO_2$ sorbent technology, excellent heat transmitting characteristics are demonstrated, little waste water is generated and corrosion rarely occurs. Additionally, the dry regenerable sorbent technology has many advantages in terms of low-price raw materials, design flexibility, environmental friendliness, applicability of low-energy absorption processes, high carbon dioxide sorption capacity with high reaction rate, and the like, so that it can be recognized as a promising technology capable of continuously growing and developing over other technologies in many aspects.

Conventional patents relating to dry regenerable absorbent for carbon dioxide capture include U.S. Pat. Nos. 7,045,483, 6,280,503, 7,314,847, 7,314,847, 7,314,877, 4,515,900, 7,067,456, and 5,214,019, Japanese Patent Application Publication No. 2007-090208, and U.S. Patent Application Publication No. 20070072769, and so on.

The above-mentioned patents mainly relate to an absorbent prepared by combining an active component with a support, an inorganic binder and an organic binder or combining an active component with a support, or an active component itself. The techniques disclosed in these patents may also be applied to quite different application fields, and thus are inappropriate to be applied to a process of preparing a large scale of absorbents due to different preparation methods, including preparation by physical mixture, preparation by supporting, and the like. In particular, the disclosed techniques are inappropriate to be applied to a process of capturing and separating carbon dioxide while solid absorbent particles are continuously transported between absorption and recycling reactors. Therefore, the techniques are inefficient to be applied to industrial processes of releasing a large amount of carbon dioxide, such as thermal power generation plants, iron and steel industry, petrochemical plants and cement plants.

U.S. Pat. No. 782,059, Japanese Patent No. 4181132, Chinese Patent No. 200410101564.0 and Korean Patent No. 10-0620546, issued to Korea Electric Power Corporation (KEPCO), disclose methods for an absorbent capable of absorbing $CO_2$ at 50 to 110° C. and recycling $CO_2$ at 80 to 180° C., the absorbent produced by spray drying a raw material including an active component of an alkali metal or alkaline earth metal compound and a variety of supports. $CO_2$ may also be removed by an absorbent containing an amine compound in a solid porous support in addition to a metal compound based solid absorbent. U.S. Pat. Nos. 5,492,683 and 5,876,488 disclose solid carbon dioxide absorbents containing liquid amine compounds reacting at room temperature. U.S. Pat. No. 4,810,266 discloses removal of $CO_2$ in a room temperature range using a solid absorbent containing an amine compound in a carbon body.

In addition, WO2004/054705 discloses a solid absorbent for capturing $CO_2$ using an amine compound physically adsorbed or chemically connected to a surface of mesoporous silica, and U.S. Pat. Nos. 6,908,497 and 6,547,854 disclose methods for preparing a solid absorbent receiving an amine compound into a surface-treated support.

Korean Patent Application No. KR10-2011-0006073 discloses a method for preparing porous silica having a micropore and mesopore structure and a $CO_2$ absorbent receiving an amine compound into the prepared porous silica.

The above-mentioned patents disclosing solid absorbents (or sorbents) containing amine compounds mainly relate to an absorbent prepared by adding an active component to a support or an active component itself, and thus are inappropriate to be applied to a fluidized bed or high speed fluidized bed dry capturing process of capturing and separating $CO_2$ while solid absorbent particles are continuously transported between absorption and recycling reactors. Thus, the disclosed techniques are inappropriate in view of morphology or performance to be applied to efficiently, cost-effectively capture $CO_2$ in a gas streams having a low partial pressure of $CO_2$, such as a flue gas. Accordingly, it is necessary to develop technology for efficiently, cost-effectively capture $CO_2$ in a large amount of flue gases.

DISCLOSURE OF THE INVENTION

Technical Problems to be Solved

A solid absorbent applied to the dry capturing process including an absorption reactor and a recycling reactor should have a $CO_2$ sorption capacity and a high sorption rate during continuous circulation of sorption and recycling processes, should comply with flue gas or gas stream conditions, and should meet conditions for removing even a low content of $CO_2$ and isolating captured $CO_2$ with high purity during a recycling process. In addition, the solid absorbent should have increased strength against physical attrition, such as collision, abrasion, fracture and cracking or chemical attrition due to volumetric expansion or shrinkage resulting from chemical reactions during the circulation through the two reactors.

To meet the requirements, in the present invention, a porous carrier satisfying the physical and chemical requirements of an absorbent is prepared using a spray drying forming method, and an absorbent containing an amine compound in a carrier is prepared.

Technical Solution

In accordance with one aspect of the present invention, there is provided a method for manufacturing a carbon dioxide absorbent, the method including the steps of (A) preparing a slurry composition including a carrier composition containing a support and an inorganic binder, and a solvent, (B) preparing solid particles by spray drying the prepared slurry composition, (C) manufacturing a carrier by dry calcining the solid particles, and (D) receiving an amine compound into fine pores of the manufactured carrier.

Advantageous Effects of the Invention

The absorbent according to the present invention captures carbon dioxide in such a manner that an active component received into micropores and mesopores developed in carrier particles selectively react with carbon dioxide and simultaneously satisfies physical characteristics, thereby directly applying the absorbent to a fluidized-bed or high speed fluidized bed dry capturing process to be continuously reusable (to be briefly referred to as a dry capturing process, hereinafter).

In addition, the absorbent according to the present invention can overcome physical attrition, such as collision, abrasion, fracture and cracking or chemical attrition due to volumetric expansion or shrinkage resulting from chemical reactions in the fluidized bed or high speed fluidized bed reactor.

In addition, in the present invention, mass production of porous carrier particles is facilitated using a spray drying process, and a high production yield is achieved, thereby reducing the cost. Further, particle properties meeting requirements of a fluidized bed in receiving of an amine compound can be advantageously obtained. In addition, since sorption and recycling reactions are allowed in a low temperature range (100° C. or below), a reduction in the $CO_2$ capturing cost can be expected, compared to the conventional dry capturing process in which an absorbent having an alkali metal and an alkali earth metal compound as an active component is used.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

BEST MODE FOR CARRYING OUT THE INVENTION

Figure 1:
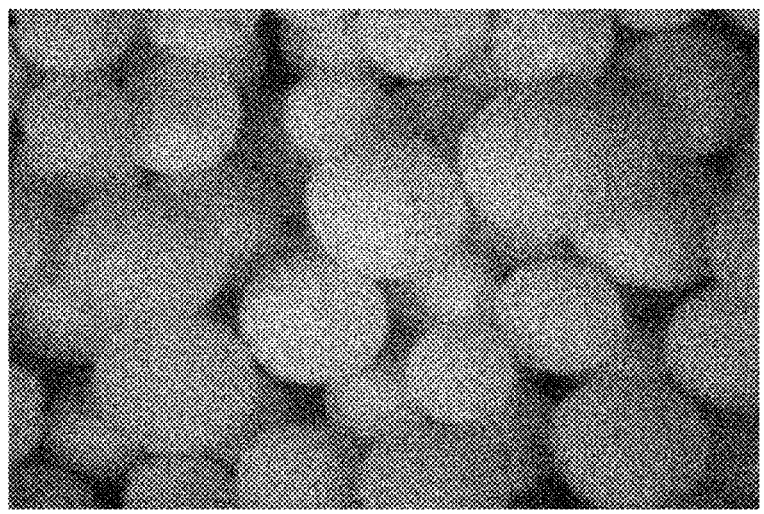
FIG. 1 is a scanning electron microscope (SEM) photograph of a support A prepared in step 1 of Example 1 of the present invention.

The present invention is directed to a method for manufacturing a carbon dioxide absorbent, the method including (A) preparing a slurry composition comprising a carrier composition including a support and an inorganic binder and a solvent; (B) preparing solid particles by spray drying the prepared slurry composition; (C) preparing a carrier by dry calcining the solid particles; and (D) receiving an amine compound into fine pores of the carrier.

Hereinafter, a method for manufacturing a carbon dioxide absorbent according to the present invention will be described in detail with reference to the accompanying drawings.

In the present invention, step (A) is to prepare a slurry composition including a carrier composition and a solvent. In the present invention, the carrier composition includes a support and an inorganic binder.

The support includes an amine compound as an active component to have high reactivity with carbon dioxide by forming a micropore and mesopore structure in carrier particles so as to be well dispersed in the carrier particles and to adsorb or absorb moisture required for a reaction to be caused.

The support preferably has a large specific surface area, and the kind of the support is not particularly limited. For example, a basic support, a neutral support or an amphoteric support may be used as the support.

In detail, usable examples of the basic support may include calcium oxide (CaO), zinc oxide (ZnO), and magnesium oxide (MgO), usable examples of the neutral support may include carbon molecular sieve or carbon nano tubes, magnesium (Mg) and aluminum (Al) containing oxide ($MgAl_2O_4$), magnesium (Mg) and silicon (Si) containing oxides ($MgSiO_2$, $MgSiO_3$), calcium (Ca) and aluminum (Al) containing oxides ($CaAl_2O_4$, $Ca_3Al_2O_4$) and calcium (Ca) and silicon (Si) containing oxides ($Ca_2SiO_4$, $Ca_2SiO_3$), and usable examples of amphoteric support may include alumina ($Al_2O_3$), titanium dioxide ($TiO_2$), zirconium oxide ($ZrO_2$) and cesium oxides ($CeO_2$, $Ce_2O_3$). The support may be used alone or in combination of two or more elements.

In the present invention, the support may be contained in an amount of 20 to 85 parts by weight, based on the total weight of the carrier composition. Preferably, the support is contained in an amount of 40 to 80 parts by weight. If the content of the support is less than 20 parts by weight, physical strength of the support may be weakened. If the content of the support is greater than 85 parts by weight, the prepared carrier demonstrates the same physical property as in an amount equal to or less than 85 parts by weight, resulting in an increase of the manufacturing cost.

In the present invention, the inorganic binder is a material that imparts mechanical strength to an absorbent by improving a binding force between constituent raw materials of the carrier so as to be usable for an extended period of time without the loss due to attrition.

In the present invention, usable examples of the inorganic binder may include one or more selected from the group consisting of a cement-like inorganic binder, a clay-like inorganic binder, and a ceramic-like inorganic binder. Here, specific examples of the clay-like inorganic binder may include bentonite, kaolin, and the like, specific examples of the ceramic-like inorganic binder may include alumina sol, silica sol, boehmite, and the like, and specific examples of the cement-like inorganic binder may include calcium silicate, calcium aluminate, and the like. Here, the inorganic binder may be used alone or in combination of two or more elements.

In the present invention, the inorganic binder may be contained in an amount of 5 to 50 parts by weight, based on the total weight of the carrier composition. Preferably, the inorganic binder is contained in an amount of 10 to 30 parts by weight. If the content of the inorganic binder is less than 5 parts by weight, a binding force between raw materials (e.g., between the support and the inorganic binder) may be weakened, thereby lowering physical properties of the carrier composition. If the content of the inorganic binder is greater than 50 parts by weight, the amine compound that is not received into fine pores may close entrances of the fine pores of carrier particles, thereby retarding a reaction between the carrier and carbon dioxide ($CO_2$) and ultimately lowering $CO_2$ sorption capacity.

In step (A) of the present invention, the carrier composition and a solvent are mixed to prepare a slurry composition.

In the present invention, the kind of the solvent is not particularly limited, and solvents that are generally used in the related art may be used. In detail, water, or alcohol, such as methanol or ethanol, may be used as the solvent. Water is preferably used as the solvent.

In the slurry composition of the present invention, the carrier composition may be contained in an amount of 15 to 60 parts by weight, based on the total weight of the slurry composition. If the content of the carrier composition is less than 15 parts by weight, an amount of slurry used to prepare the absorbent may increase, thereby lowering the manufacturing efficiency of the absorbent. If the content of the carrier composition is greater than 60 parts by weight, a viscosity of the slurry may increase by the increase in the amount of the slurry, lowering flowability, which may make it difficult to properly perform a spray drying process.

The slurry composition according to the present invention may further include additives for imparting plasticity and dispersability to the carrier composition in the course of mixing the slurry composition with water as the solvent. That is to say, in order to homogenize the carrier composition and to control the concentration, viscosity, stability, flowability, strength and density of the slurry, the carrier composition may further include one or more organic additives selected from the group consisting of a dispersant, a defoamer, and an organic binder.

In the present invention, the dispersant, the defoamer and the organic binder are all preferably used.

In the present invention, the dispersant is used to prevent agglomeration of fine particles during a comminuting process to be described below. That is to say, the dispersant may be used to prevent comminuting efficiency from being lowered due to the agglomeration of the comminuted fine powder particles during the comminuting process for controlling particle sizes of raw materials of the carrier.

Examples of the dispersant useful in the present invention may include one or more selected from the group consisting of an anionic dispersant, a cationic dispersant, an amphoteric dispersant, and a non-ionic dispersant. The anionic dispersant is preferably used. The anionic dispersant includes polycarboxylic acid, polycarboxylic acid amine, polycarboxylic acid amine salt, and polycarboxylic acid sodium salt. The non-ionic dispersant may include a fluorosurfactant. The anionic dispersant may be contained in an amount of 0.1 to 10 wt %, based on the total solid materials. The non-ionic dispersant may be contained in an amount of 0.01 to 0.3 wt %, based on the total solid materials.

In the range stated above, an excellent particle dispersing effect may be demonstrated. In the present invention, the defoamer may be used to remove bubbles formed in the slurry including the dispersant and the organic binder. Examples of the defoamer may include metal soap-based and polyester-based nonionic surfactants.

The defoamer may be contained in an amount of 0.01 to 0.2 parts by weight, based on the total weight of solid raw materials. If the amount of the defoamer is too small, bubbles are generated during the slurry preparation process, spherical shapes may not be obtained during a spray drying process. However, if the amount of the defoamer is too large, harmful gases may be undesirably generated during a calcining process. The content of the defoamer may be adjusted according to the amount of bubbles generated.

In the present invention, the organic binder imparts plasticity and flowability to the slurry to then provide strength to the solid particles formed in the spray drying process, thereby facilitating handling of the particles prior to drying and calcining. In the present invention, usable examples of the organic binder may include one or more selected from the group consisting of a polyvinylalcohol-based material, a polyglycol-based material and methylcellulose.

In the present invention, the kind of the organic binder is not particularly limited and may be used in an amount of 0.5 to 5 parts by weight, based on the total weight of the solid raw materials. If the content of the organic binder is less than 0.5 parts by weight, a binding force of the spray-dried solid particles may be weakened, making it difficult for the solid particles to maintain spherical shapes until the drying and the calcining are performed. However, if the content of the organic binder is greater than 5 parts by weight, performance of final materials may be lowered due to the remainder of the organic binder after the calcining.

In the present invention, in order to adjust pH of the slurry composition, a pH controlling agent may be further added. Examples of the pH controlling agent may include organic amine, aqueous ammonia, and so on.

In the present invention, after performing step (A), steps of stirring and comminuting the prepared slurry composition and removing foreign substances from the stirred and comminuted slurry composition, may further be performed.

In detail, the stirring may be performed using a stirrer during and/or after adding all of elements contained in the slurry composition. Here, examples of the stirrer may include at least one machine selected from a mechanical stirrer, a double-helix mixer, a high speed emulsifier, a homogenizer, a high shear blender, and an ultrasonic homogenizer, and the stirrer may be selectively used according to the amount of a raw material added.

In the present invention, the comminuting is performed to more homogeneously disperse the raw materials (e.g., a support and an inorganic binder) in the slurry. When necessary, a defoamer and a dispersant may be additionally added during the comminuting, and a pH controlling agent may be used to prepare a more stabilized slurry composition.

In the present invention, in order to improve a comminuting effect and to solve a problem of scattering of particles during dry comminuting, wet comminuting may be used.

In the comminuting, various mills may be used. Here, usable examples of the mill may include a roller mill, a ball mill, an attrition mill, a planertary mill, a bead mill, a high energy bead mill, and so on, and the high energy bead mill is preferred in the present invention.

When the high energy bead mill is used, a filling quantity of milling media in comminuting or milling and homogenizing is preferably 60 to 80% of the volume of a milling container. Yttrium stabilized zirconia beads that are excellent in strength and stability may be used as the milling media. The beads preferably have a size distribution in a range of 0.3 mm to 1.25 mm.

In the present invention, the comminuting may be performed twice or more to produce a homogenous slurry composition. After the comminuting, a dispersant and a defoamer may be added to the slurry (mixture) to control the flowability of the slurry composition, thereby facilitating transfer of the slurry mixture to the milling container for a subsequent comminuting via a pump.

In addition, prior to final comminuting, an organic binder may be added to homogenize the slurry composition.

The concentration and the viscosity of the comminuted slurry composition may be adjusted using the dispersant, the defoamer or an additional solvent.

Meanwhile, if pore size diameters of the raw material particles are less than several microns, the comminuting may not be performed.

In the removing of the foreign substances, the foreign substances causing nozzle plugging during the spray drying process, or lumps of the raw materials may be removed. The removing of the foreign substances may be performed by sieving.

The flowability of the final slurry composition prepared in the present invention is not specifically restricted but is in any level of viscosity so long as the final slurry composition is pumpable to a nozzle.

Step (B) of the present invention is to spray-dry the slurry composition to produce solid particles.

In step (B), the spray drying of the slurry composition may be performed using a spray dryer. In detail, the slurry composition is transferred to the spray dryer using the pump, and the transferred slurry composition is sprayed into the spray dryer via the pump to form the solid particles. Here, the viscosity of the final slurry composition prepared in the present invention is not specifically restricted so long as the final slurry composition is pumpable to the nozzle in the spray dryer, and the slurry composition is preferably sprayed to have a viscosity of not lower than 300 cP.

In the present invention, operational conditions of the spray drier for forming the solid particles in the spray dryer may include the operational conditions generally used in the related art.

In addition, the spraying method of the slurry composition is not specifically restricted. For example, a counter-current spraying process, in which the slurry composition is sprayed in the opposite direction to the flow of air to be dried, may be performed using a pressure nozzle. That is to say, the counter-current spraying, in which the pressure nozzle is arranged at a bottom side of the spray drier, may be performed to increase a retention time of sprayed particles in the spray dryer for the purpose of controlling an average particle size of the solid particles in the spray dryer.

Since the shape, particle size and particle size distribution of the absorbent particles, and the morphology or texture of the absorbent are affected by the concentration, viscosity and dispersion of the slurry composition, feed pressure and feeding amount of the slurry into the nozzle in the spray dryer, and the drying capacity and temperature of the spray drier, etc., the structure of the spray drier and the spraying type may be appropriately adjusted.

In the present invention, the feed pressure of the spray dryer may be in a range of 5 to 15 kg/cm$^2$, an inner diameter of the pressure nozzle may be in a range of 0.4 to 1.6 mm, a temperature of an inlet of the spray dryer may be in a range of 230 to 300° C., and a temperature of an outlet of the spray dryer may be in a range of 90 to 160° C.

The particle size distribution of the solid particles produced in step (B) is preferably in a range of 30 to 350 μm, and the average particle size of the solid particles is preferably in a range of 70 to 180 μm.

Step (C) of the present invention is to prepare a carrier by dry calcining the solid particles prepared in step (B).

In the present invention, the drying of the solid particles may be performed in a reflux dryer at 110 to 150° C. for more than 2 hours. Here, the drying is performed in an air atmosphere.

If the drying is completed, the dried particles are put into a high-temperature calcination furnace, and calcination temperature is raised at a speed of 0.5 to 10° C./min, and then calcined for more than 2 hours at a final calcination temperature ranging from 350 to 1000° C.

In the present invention, the solid particles may be stayed at two or more stages of stagnation temperatures each for more than 30 minutes before reaching the final calcining temperature.

In the present invention, the calcining may be performed using a calcining furnace, such as a muffle furnace, a tubular furnace or a kiln.

In addition, in the present invention, the calcining may be performed in an atmosphere of air, nitrogen, helium, hydrogen, vapor or a reducing gas. Here, the flow rate of the atmospheric gas may be greater than or equal to 60 ml/min. In the present invention, as the result of the calcining, the organic additives (e.g., the dispersant, the defoamer and the organic binder) added in preparing the slurry are burnt and the raw materials are combined with each other, thereby increasing strengths of the particles.

The finally obtained carrier in step (C) may have a BET surface area of 50 to 500 m$^2$/g, preferably 150 to 400 m$^2$/g. When the carrier has a BET surface area within the range stated above, it is easy to receive an amine compound into the carrier, which will later be described.

Step (D) of the present invention is to receive the amine compound into the carrier. In step (D), the amine compound is uniformly dispersed in fine pores of the carrier.

In step (D), the receiving of the amine compound may be performed by a wet receiving method. In detail, step (D) may include steps of dissolving the amine compound in a solvent, and mixing the carrier prepared in step (C) with the solvent and stirring the resultant product.

There is no particular restriction on the kind of the amine compound used in step (D) and any amine compound generally used in the related art may be used. In detail, usable examples of the amine compound may include a primary amine compound, such as monoethanolamine (MEA), tetraethylenepentamine (TEPA), or tetraethylenetetraamine (TETA), a piperazine-based cyclic secondary amine compound, such as piperazine or 2-piperidine ethanol, a cyclic tertiary amine compound, such as 1-(2-hydroxyethyl)piperazine, or an amine compound polymer, such as polyethyleneimine (PEI).

The amine compound may be contained in an amount of 5 to 70 parts by weight, preferably 10 to 50 parts by weight, based on the total weight of the carrier. If the content of the amine compound is less than 5 parts by weight, a carbon dioxide sorption capacity may be lowered. However, if the content of the amine compound is greater than 70 parts by weight, the amine compound may be excessively used, which may close fine pores of the carrier, retarding a reaction between the carrier and carbon dioxide.

In addition, distilled water, an organic solvent or a mixture thereof may be used as the solvent, and methanol or ethanol may be used as the alcohol.

The stirring may be performed at 30 to 80° C. After the stirring, the solid particles (that is, the receiving of the amine compound) are evaporated and dried at 60 to 100° C. or filtered using a filter bed, thereby manufacturing the absorbent.

In addition, in the present invention, the carrier is contained in a sievable container and a solution having the amine compound dissolved therein is continuously circulated, thereby manufacturing the absorbent.

In addition, the present invention is also directed to a method for manufacturing the carbon dioxide.

The carbon dioxide absorbent has an amine absorbent dispersed in fine pores of the carrier.

The carbon dioxide absorbent manufactured by the method according to the present invention demonstrate higher carbon dioxide sorption capacity than liquid amine sorption capacity in the presence of moisture, and excellent recycling capacity. In addition, since carbon dioxide sorption and absorbent regeneration are allowed at 120° C. or below, the carbon dioxide absorbent can be advantageously used in a process of removing carbon dioxide in a combustion gas stream.

In particular, the carbon dioxide absorbent manufactured according to the present invention demonstrates regeneration capability of 80% or higher at 80° C., preferably 85% or higher.

The present invention will now be described in more detail with reference to Examples according to the present invention and Comparative Examples. However, these examples are given for the purpose of illustration and are not to be construed as limiting the scope of the invention.

<Measurement of Physical Properties of Absorbents Prepared in Examples>

1) Observation of Absorbent Shape

An absorbent shape was observed with the naked eye, or using an industrial microscope or a scanning electron microscope (SEM).

2) Measurement of Average Particle Size and Size Distribution of Absorbent

An average particle size and a size distribution of an absorbent were measured according to the standard sieving method, ASTM E-11. Here, 10 g of an absorbent sample was subjected to sieving in a sieve shaker for 30 minutes, and then the average particle size and size distribution were calculated according to the following method.

3) Measurement of Tap Density)

A tap density of an absorbent was measured using an apparatus and a method presented by the standard specification, ASTM D 4164-88.

4) Measurement of Specific Surface Area (BET) and Pore Volume

A specific surface area and a pore volume of an absorbent were measured using a quantachrome multi BET surface area meter and an Hg porosity meter, respectively.

5) Measurement of Attrition Resistance Index (AI)

Attrition resistance of an absorbent molded by spray drying was measured using a 3-hole attrition tester manufactured corresponding to ASTM D5757-95 according to a test method and a sequence presented by the specification.

An attrition resistance index (AI) calculated by the method presented by ASTM refers to a ratio of an amount of fine powder captured after being abraded in an attrition tube at a flow rate of 10 standard liters per minute (slpm) for 5 hours, based on an initial amount of a sample (50 g). The AI is one of the important indexes among requirements of a (fluidized bed or high speed fluidized bed) process, the process preferring to AI at less than 30%.

It was shown that attrition strength was increased as the AI expressed as the attrition resistance decreased.

Example 1

Step 1: Preparation of Spherical Porous Solid Particles (Carrier)

Spherical porous solid particles (carrier) were prepared using 69 parts by weight of gamma alumina ($\gamma$-Al$_2$O$_3$) as an amphoteric support, 10 parts by weight of synthetic calcium silicate as an inorganic binder, 14 parts by weight of pseudo-boehmite, and 7 parts by weight of bentonite, based on the total weight (6 kg) of solid raw materials.

In detail, the raw materials were added sequentially or simultaneously to distilled water weighed until the slurry concentration (the content of solid raw materials, based on the total weight of slurry) reached about 35%, followed by the addition of a dispersant and a defoamer. The slurry was stirred using a homogenizer capable of stirring at a speed of 10,000 to 25,000 rpm. The mixed slurry was milled twice using a high-energy bead mill to obtain colloidal slurry. To the colloidal slurry was added about 1.25 wt % of polyethylene glycol (PEG) as an organic binder. The resulting slurry was stirred, aged for 2 hours or more, and sieved to remove foreign substances. When necessary, distilled water, a dispersant and a defoamer were added to adjust a content of solid raw materials of the final slurry to about 22.3 parts by weight, a viscosity of the slurry to about 25,700 cP and a pH of the slurry pH to 10.47, and the prepared slurry was then spray-dried.

The spray-dried solid particles were pre-dried in a dryer at 120° C. for 2 hours or more, and was then calcined in a box-shaped furnace at 550° C. for 2 hours or more to prepare the final carrier (to be designated by Support-A) and were allowed to stay at 200° C., 300° C. and 400° C. each for one hour before reaching the final calcining temperature. At this time, the temperature was elevated at a rate of about 5° C./min.

Table 1 summarizes physical properties of the prepared support-A.

TABLE 1

| Average particle size (μm) | Tap density (g/cc) | BET surface area (m2/g) | Hg porosity (%) | Attrition resistance index (AI, %) |
|---|---|---|---|---|
| 108 | 0.91 | 387.4 | 71.73 | 0.14 |

As can be seen from the data in Table 1, the carrier prepared according to the present invention has excellent BET surface area, high porosity and excellent attrition resistance index.

FIG. 1 shows a particle size of the Support-A. As shown in FIG. 1, the prepared carrier has a spherical shape.

Step 2: Receiving Amine Compound into Carrier

Based on the weight of the carrier, 15 parts by weight of each of an amine compound (PEI having a molecular weight of about 1800), MEA, TETA and 2-Amino-2-methyl-1-propanol (AMP) as active components, were dissolved in distilled water, followed by adding the carrier prepared in step 1 to the distilled water and stirring the mixture at 50° C. for more than 10 hours.

The carrier having the amine compound received thereinto was processed with a rotary evaporator under a pressure of less than 100 mmHg at a temperature of about 65° C. to evaporate the solvent, thereby manufacturing carbon dioxide absorbents each having the amine compound received into micropores and mesopores for use in a dry capturing process. The manufactured carbon dioxide absorbents were expressed by A-PEI, A-MEA, A-TETA and A-AMP.

Figure 2:
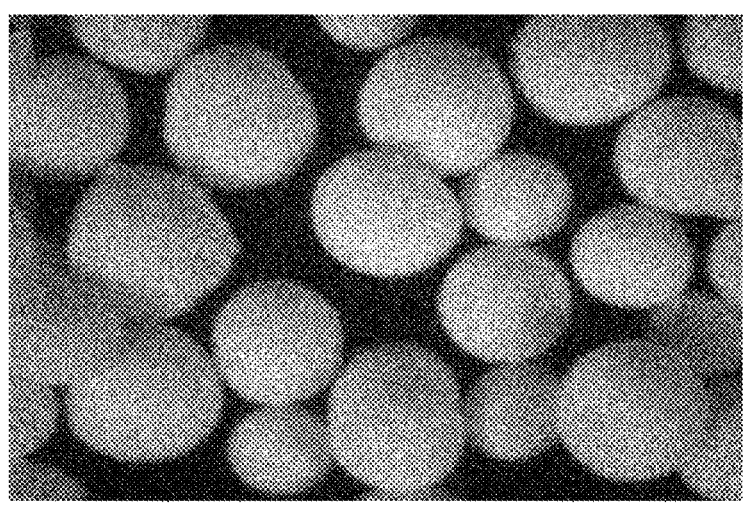
FIG. 2 is an SEM photograph of A-PEI prepared in Example 1 of the present invention.

FIG. 2 is an SEM photograph of A-PEI prepared in Example 1 of the present invention. As confirmed from FIG. 2, there is no difference between shapes of the solid absorbent prepared in Example 1 and the carrier shown in FIG. 1.

Figure 3:
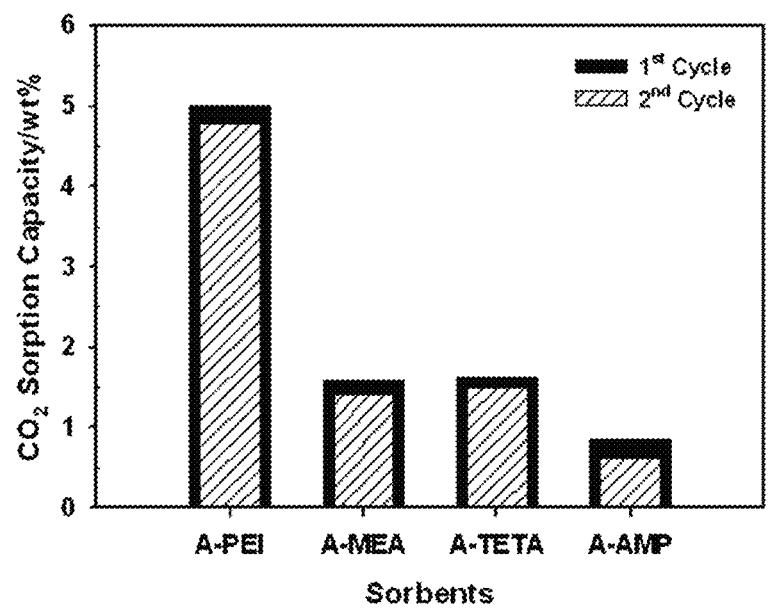
FIG. 3 is a graph illustrating a TGA sorption capacity test result of A-PEI prepared in Example 1 of the present invention.

FIG. 3 is a graph illustrating a TGA sorption capacity test result of A-PEI prepared in Example 1 of the present invention.

In the present invention, the $CO_2$ sorption capacity was measured on a thermogravimetric analyzer (TGA), while feeding simulated flue gases containing 14.4 vol % $CO_2$, 5.4 vol % $O_2$, 7 vol % $H_2O$ and 73.2 vol % $N_2$. Here, the sorption was carried out at 50° C. and the regeneration was carried out at 80° C. As shown in FIG. 3, an initial sorption capacity of A-PEI was 5.0 wt %. Combined sorbents of organic and inorganic sorbents having such compositions as proposed in the present invention had 95% or higher in regeneration capability at 80° C.

Comparative Example 1

A carrier and an absorbent were manufactured in substantially the same manner as in Example 1, except that a molecular sieve 13X (Cheonho Material, Korea) was used as an acidic support.

The manufactured carrier was expressed as support-B, and absorbents each having an amine compound received into the support-B were expressed as B-PEI, B-MEA, B-TETA and B-AMP.

Table 2 summarizes physical properties of the prepared support-B.

TABLE 2

| Average particle size (μm) | Tap density (g/cc) | BET surface area (m²/g) | Hg porosity (%) | Attrition resistance index (AI, %) |
|---|---|---|---|---|
| 115 | 0.83 | 165.1 | 79.24 | 1.24 |

As can be seen from the data in Table 2, the carrier using an acidic support had a lower tap density and a lower BET surface area than the carrier using an amphoteric support.

Figure 4:
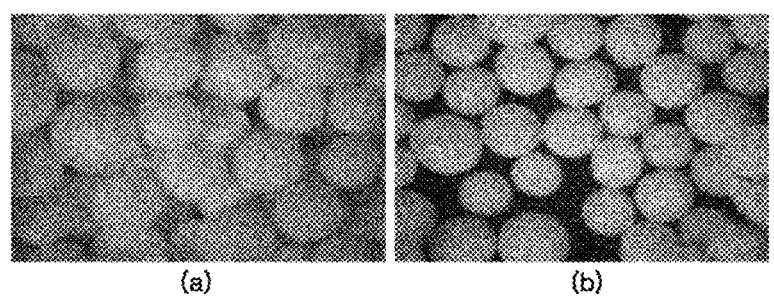
FIG. 4 illustrates SEM photographs of a support B and B-PEI prepared in Comparative Example 1.

FIG. 4 illustrates SEM photographs illustrating particles shapes of a support B (a) and B-PEI (b) prepared in Comparative Example 1. As confirmed from FIG. 4, there is no difference between carrier shapes before and after receiving the amine compound (PEI).

Figure 5:
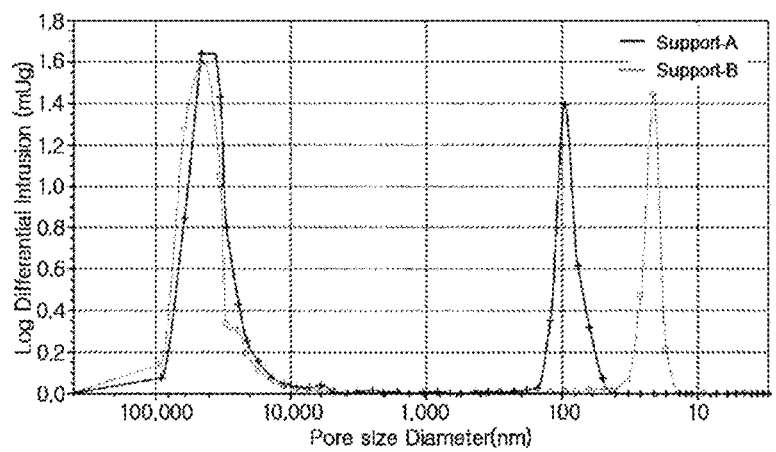
FIG. 5 is a graph illustrating distributions of micropores and mesopores of a support A and a support B.

FIG. 5 is a graph illustrating distributions of micropores and mesopores of a support A and a support B. Referring to FIG. 5, porosities of a micropore structure and a mesopores structure were 36.5% and 57.5%, respectively.

Figure 6:
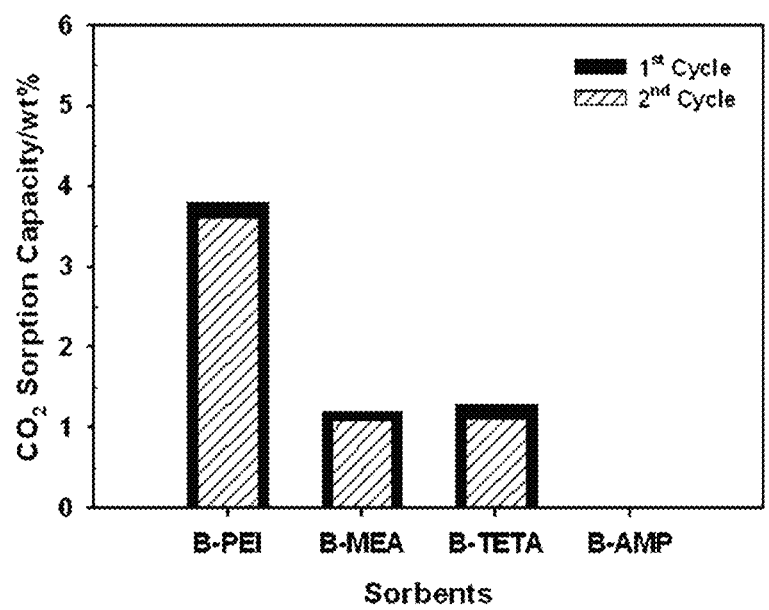
FIG. 6 is a graph illustrating a TGA sorption capacity test result of B-PEI prepared in Comparative Example 1.

FIG. 6 is a graph illustrating a TGA sorption capacity test result of B-PEI prepared in Comparative Example 1 according to the kind of amine compound used. As shown in FIG. 6, the B-PEI had a sorption capacity of 3.8 wt %, which is smaller than that of A-PEI using the amphoteric support (see FIG. 3).

Example 2

Carriers and absorbents were manufactured in substantially the same manner as in Example 1, except that 30 to 100 parts by weight of 2-peperidine ethanol that is a cyclic secondary amine compound as an active component was dissolved in methanol and used.

Among the prepared sorbents, 2-peperidine ethanol used in an amount of 30 parts by weight was expressed as A-PZ1, 2-peperidine ethanol used in an amount of 40 parts by weight was expressed as A-PZ2, 2-peperidine ethanol used in an amount of 50 parts by weight was expressed as A-PZ3, and 2-peperidine ethanol used in an amount of 100 parts by weight was expressed as A-PZ4.

Table 3 summarizes physical properties of the prepared sorbents.

TABLE 3

| Sorbent | A-PZ1 | A-PZ2 | A-PZ3 | A-PZ4 |
|---|---|---|---|---|
| Amine content (wt %) | 11.84 | 13.1 | 12.95 | 11.97 |
| BET surface area (m²/g) | 269 | — | 259 | — |
| Mesopore volume, cm³/g | 0.34 | — | 0.10 | — |
| Micropore volume, cm³/g | 0.33 | — | 0.10 | — |

As can be seen from the data in Table 3, a content of amine contained in the carrier was in a range of 11.8 to 13.1 wt %. Amounts of amine contained in the carriers were measured using a thermogravimetric analyzer (TGA).

Figure 7:
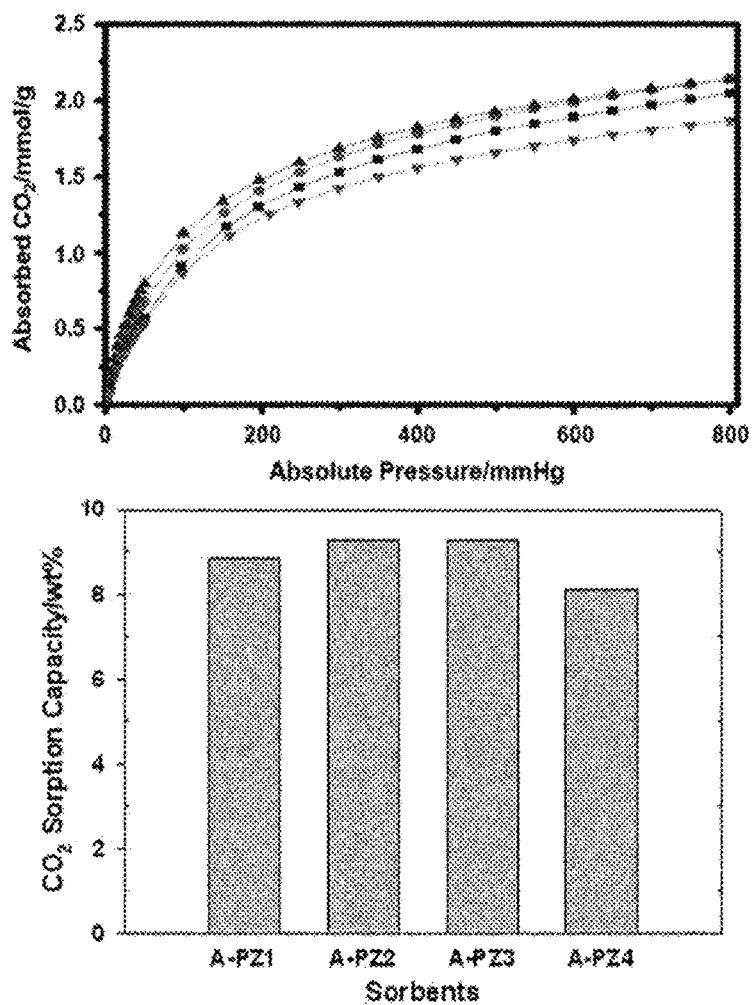
FIG. 7 is a graph illustrating $CO_2$ adsorption isotherm and sorption capacity of absorbents prepared in Example 2.

FIG. 7 is a graph illustrating $CO_2$ adsorption isotherm and sorption capacity of absorbents prepared in Example 2.

As confirmed from the graph shown in FIG. 7, the sorbents had excellent $CO_2$ sorption capacities ranging from 8.1 to 9.3 wt %.

Comparative Example 2

A carrier and a sorbent were manufactured in substantially the same manner as in Example 1, except that 50 to 100 parts by weight of 2-peperidine ethanol that is a cyclic secondary amine compound as an active component was dissolved in methanol and used.

The prepared sorbents were expressed as B-PZ1 and B-PZ2.

Receiving amounts, $CO_2$ adsorption isotherm and sorption capacity of 2-peperidine ethanol received into the carrier prepared in Comparative Example 2 were analyzed. The amounts of 2-peperidine ethanol received into A-PZ1 and A-PZ2 were 6.95 wt % and 5.65 wt %, which were smaller than those of Example 2. The $CO_2$ sorption capacities were 1.32 wt % and 1.45 wt %, which were smaller than those of Example 2.

Example 3

A carrier and a sorbent were manufactured in substantially the same manner as in Example 1, except that based on the weight of the support-A, 15 parts by weight of PEI having a molecular weight of 800 or less was dissolved in a mixed solvent of distilled water and ethanol and received into the carrier for one hour.

Figure 8:
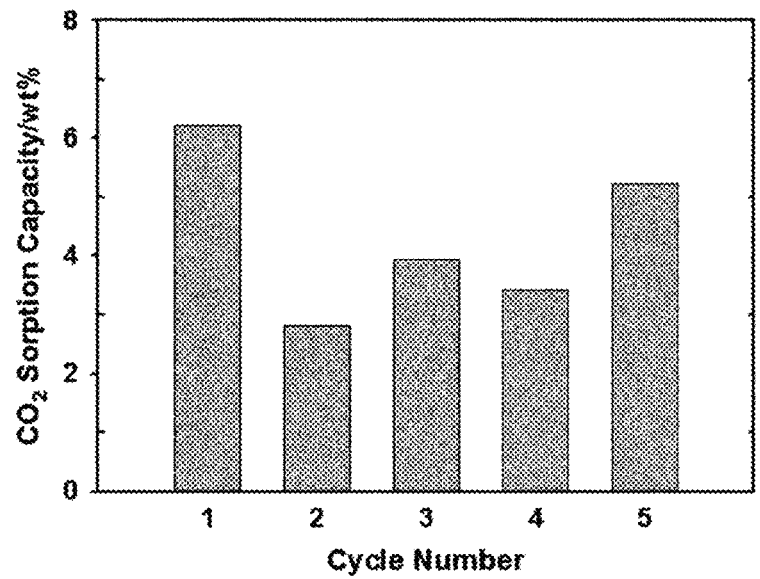
FIG. 8 is a graph illustrating 5-cycle continuous sorption capacity test results of absorbents prepared in Example 3.

FIG. 8 is a graph illustrating 5-cycle continuous sorption capacity test results of sorbents prepared in Example 3.

For $CO_2$ sorption reactions of sorbents using a batch reactor, 5 cycles of sorption reactions were continuously performed at 50° C. while feeding simulated flue gas with the same composition as the reaction gas composition proposed in Example 1. Regeneration reactions were performed while feeding 100 v/v % $CO_2$ gas, and regenerating characteristics were analyzed at 80° C., 100° C. and 120° C. for each cycle. After the fourth sorption reaction, the regeneration reaction was performed in a nitrogen atmosphere at 100° C.

As shown in FIG. 8, after the 5-cycle sorption reactions, an initial $CO_2$ sorption capacity of 80% or greater was maintained. Therefore, the sorbents can be evaluated as appropriate sorbents to be employed as carbon dioxide sorbents for use in a dry capturing process.

Comparative Example 3

Sorbents were prepared in substantially the same manner as in step 2 of Example 1, except that a molecular sieve 13X, gamma alumina and magnesium oxide having specific surface area of 30 to 60 m²/g were used as carriers, and based on the total weight of carrier, 10 parts by weight of polyethyleneimine (PEI) was used as an active component.

The prepared sorbents were expressed as 13X-PEI, $Al_2O_3$-PEI and MgO-PEI according to the kind of support used.

Table 4 summarizes physical properties of the prepared sorbents.

TABLE 4

| | Average particle size (μm) | Tap density (g/cc) | Attrition resistance index (AI, %) |
|---|---|---|---|
| 13X-PEI | 5 or less | 0.5 | Unmeasurable |
| $Al_2O_3$-PEI | 5 or less | 0.37 | Unmeasurable |
| MgO-PEI | 5 or less | 0.69 | Unmeasurable |

As can be seen from the data in Table 4, the sorbents had powdery fine particle shapes and low tap densities and were unable to measure attrition resistance indexes. Therefore, the sorbents were evaluated as inappropriate sorbents for use in a fluidized bed process.

Figure 9:
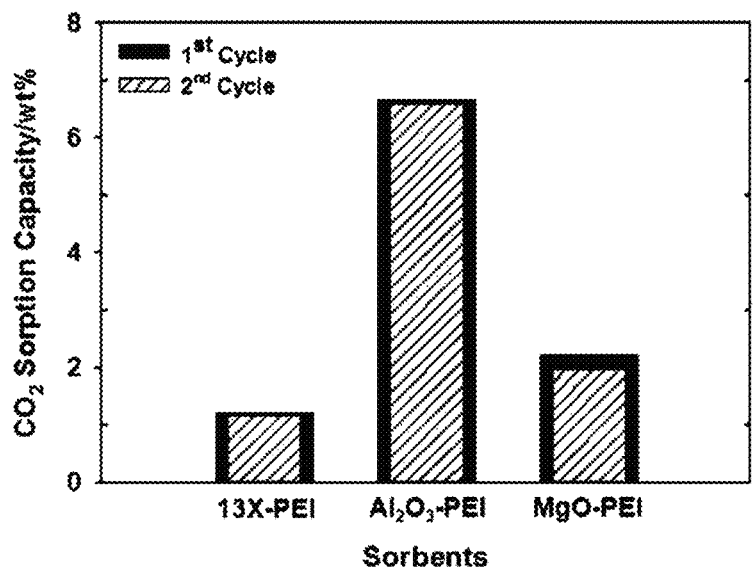
FIG. 9 is a graph illustrating a sorption capacity test result of absorbents prepared in Comparative Example 3.
Figure 10:
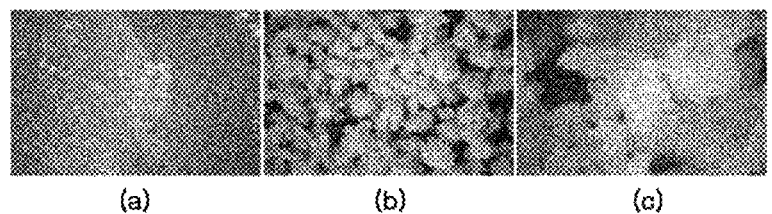
FIG. 10 illustrates SEM photographs of absorbents prepared in Comparative Example 3.

FIG. 9 is a graph illustrating a sorption capacity test result of sorbents prepared in Comparative Example 3 and FIG. 10 illustrates SEM photographs of sorbents prepared in Comparative Example 3.

As shown in FIG. 9, $CO_2$ sorption capacities of 13X-PEI and MgO-PEI were about 3 wt % or less, which is relatively low, and $CO_2$ sorption capacity of $Al_2O_3$-PEI was 6.7 wt %, which is higher than that of the sorbent prepared in Example 1. As shown in FIG. 10, the molecular sieve 13X, gamma alumina and magnesium oxide were not spherical but were powdery fine particles each having an average particle size of 5 μm or less, in terms of particle shapes, and had low tap densities. Therefore, the molecular sieve 13X, gamma alumina and magnesium oxide are difficult to be applied to a fluidized bed or high speed fluidized bed process, and it is impossible to measure attrition resistance indexes of these sorbents.

Example 4

A carrier and a sorbent were manufactured in substantially the same manner as in Example 1, except that 69 parts by weight of gamma alumina ($\gamma$-$Al_2O_3$), 10 parts by weight of synthetic calcium silicate, 14 parts by weight of pseudo-boehmite, and 7 parts by weight of bentonite were used as solid raw materials, and 30 parts by weight of TETA was used as an active component, based on the total weight of the carrier.

Table 5 summarizes physical properties of the prepared carrier.

TABLE 5

| Average particle size (μm) | Tap density (g/cc) | BET surface area (m²/g) | Hg porosity (%) | Attrition resistance index (AI, %) |
|---|---|---|---|---|
| 121 | 0.9 | — | — | 5.0 |

Figure 11:
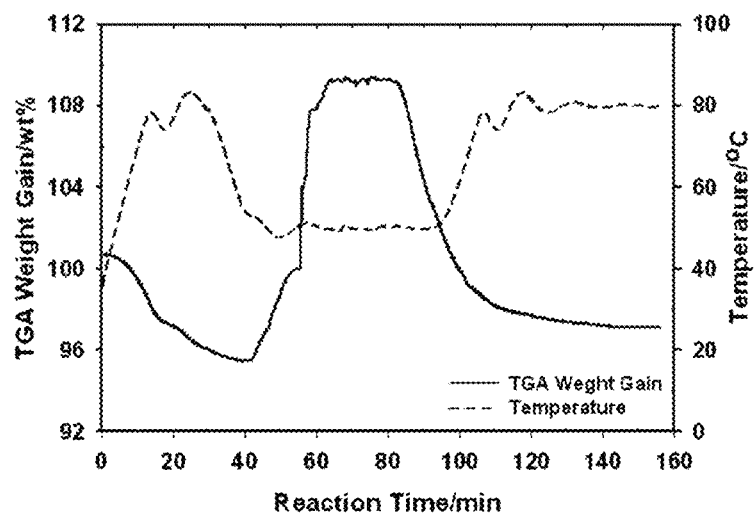
FIG. 11 is a graph illustrating a TGA weight gain test result of an absorbent prepared in Example 4.

FIG. 11 is a graph illustrating a TGA weight gain test result of a sorbent prepared in Example 4.

As shown in FIG. 11, the $CO_2$ sorption capacity of the prepared sorbent was 8.6 wt % and about 86% of the sorbent was regenerated at 80° C. That is to say, in the present invention in which the carrier having an amine compound received thereinto as an active component had excellent regeneration capability at a low temperature.

Comparative Example 4

A potassium carbonate based solid sorbent was manufactured in substantially the same manner as in step 1 of Example 1, except that 35 parts by weight of potassium carbonate, 43 parts by weight of gamma alumina ($\gamma$-$Al_2O_3$), 7 parts by weight of synthetic calcium silicate, 10 parts by weight of boehmite, and 5 parts by weight of bentonite were used as solid raw materials, based on the total weight (6 kg) of the solid raw materials.

Figure 12:
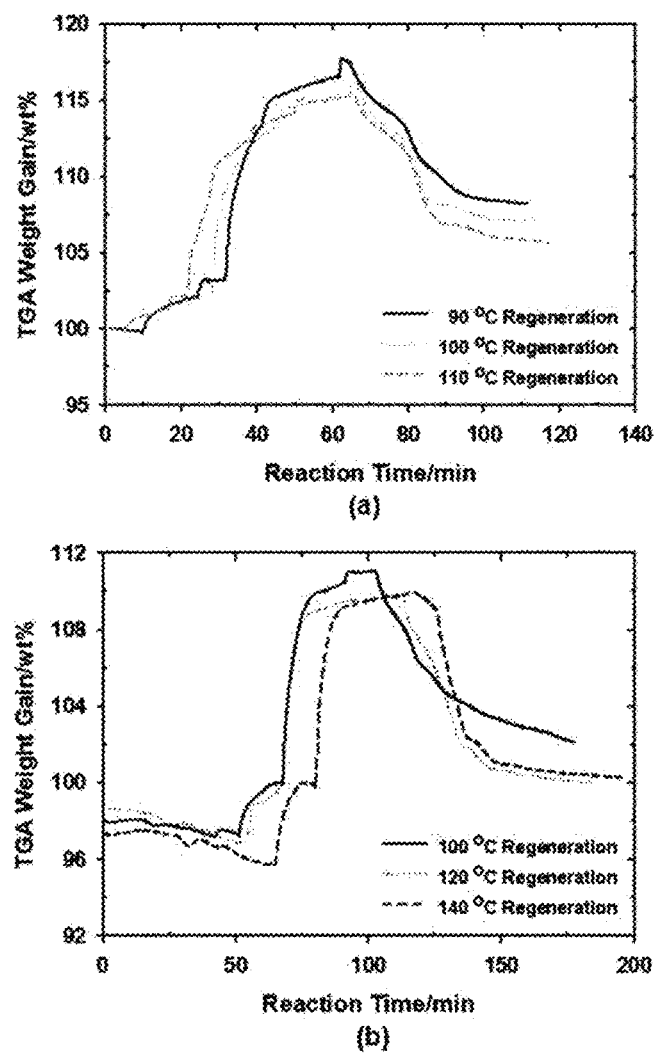
FIG. 12 illustrates graphs of TGA weight gain test results of absorbents prepared in Example 4 and Comparative Example 4 over reaction time.

FIG. 12 illustrates graphs of TGA weight gain test results of sorbents prepared in Example 4 and Comparative Example 4 over reaction time, in which the (a) graph illustrates the $CO_2$ sorption capacity of the sorbent prepared in Example 4, as evaluated at 50° C., and the (b) graph illustrates the $CO_2$ sorption capacity of the sorbent prepared in Comparative Example 4, as evaluated at 70° C.

As shown in FIG. 12, the (a) and (b) graphs show the same level of sorption capacity, while the sorbent having an amine compound received thereinto, as confirmed from the graph (a), was better than the sorbent having no amine compound received thereinto, as confirmed from the graph (b), in terms of reaction speed (reaction time/min) and low regeneration temperature.

INDUSTRIAL APPLICABILITY

As described above, in the absorbent according to the present invention captures carbon dioxide in such a manner that an active component received into micropores and mesopores developed in carrier particles selectively react with carbon dioxide and simultaneously satisfies physical characteristics, thereby directly applying the sorbent to a fluidized-bed or high speed fluidized bed dry capturing process to be continuously reusable.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A carbon dioxide absorbent manufactured by a method, the method comprising the steps of:
    (A) preparing a slurry composition including a carrier composition containing a support and an inorganic binder, and a solvent;
    (B) preparing solid particles by spray drying the prepared slurry composition;
    (C) manufacturing a carrier by dry calcining the solid particles at a temperature between about 350° C. and about 1,000° C. and under an atmosphere of one of air, nitrogen, helium, and a reducing gas, wherein the carrier has a specific surface area of between 50 $m^2$/g and 500 $m^2$/g; and
    (D) receiving an amine compound into pores of the manufactured carrier.

2. The carbon dioxide absorbent of claim 1, wherein the carrier has a specific surface area of between 150 $m^2$/g and 400 $m^2$/g.

* * * * *